United States Patent [19]

Fox

[11] Patent Number: 4,697,896
[45] Date of Patent: Oct. 6, 1987

[54] ELECTRONIC PROJECTOR

[75] Inventor: Charles Fox, Thousand Oaks, Calif.

[73] Assignee: Showscan Film Corporation, Culver City, Calif.

[21] Appl. No.: 913,680

[22] Filed: Sep. 30, 1986

[51] Int. Cl.⁴ ............................................. G03B 21/48
[52] U.S. Cl. ...................................... 352/180; 352/182
[58] Field of Search ................................ 352/180, 182

[56] References Cited

U.S. PATENT DOCUMENTS

| | | | |
|---|---|---|---|
| 3,692,394 | 9/1972 | Bauer | 352/180 |
| 3,819,258 | 6/1974 | Butler et al. | 352/163 |
| 4,022,525 | 5/1977 | Boudouris | 352/180 |
| 4,150,886 | 4/1979 | Merkel et al. | 352/166 |
| 4,215,921 | 8/1980 | Miller et al. | 352/187 |
| 4,405,217 | 9/1983 | Brant | 352/180 |

Primary Examiner—Monroe H. Hayes
Attorney, Agent, or Firm—Freilich, Hornbaker, Rosen & Fernandez

[57] ABSTRACT

A projector is described, of the type wherein a motor-driven sprocket wheel cyclically pulls a film frame-by-frame through a film gate, by applying a large accelerating voltage at the beginning of each cycle, followed by a decelerating voltage and a fine-positioning sequence, which assures that the film will lie close to the final position and be moving slowly at the beginning of the fine-positioning sequence. A determination is made as to whether the film has moved a predetermined distance by a predetermined time after the beginning of each cycle, and the accelerating voltage for the next cycle may be changed to cause such predetermined movement at that predetermined time for subsequent cycles.

16 Claims, 10 Drawing Figures

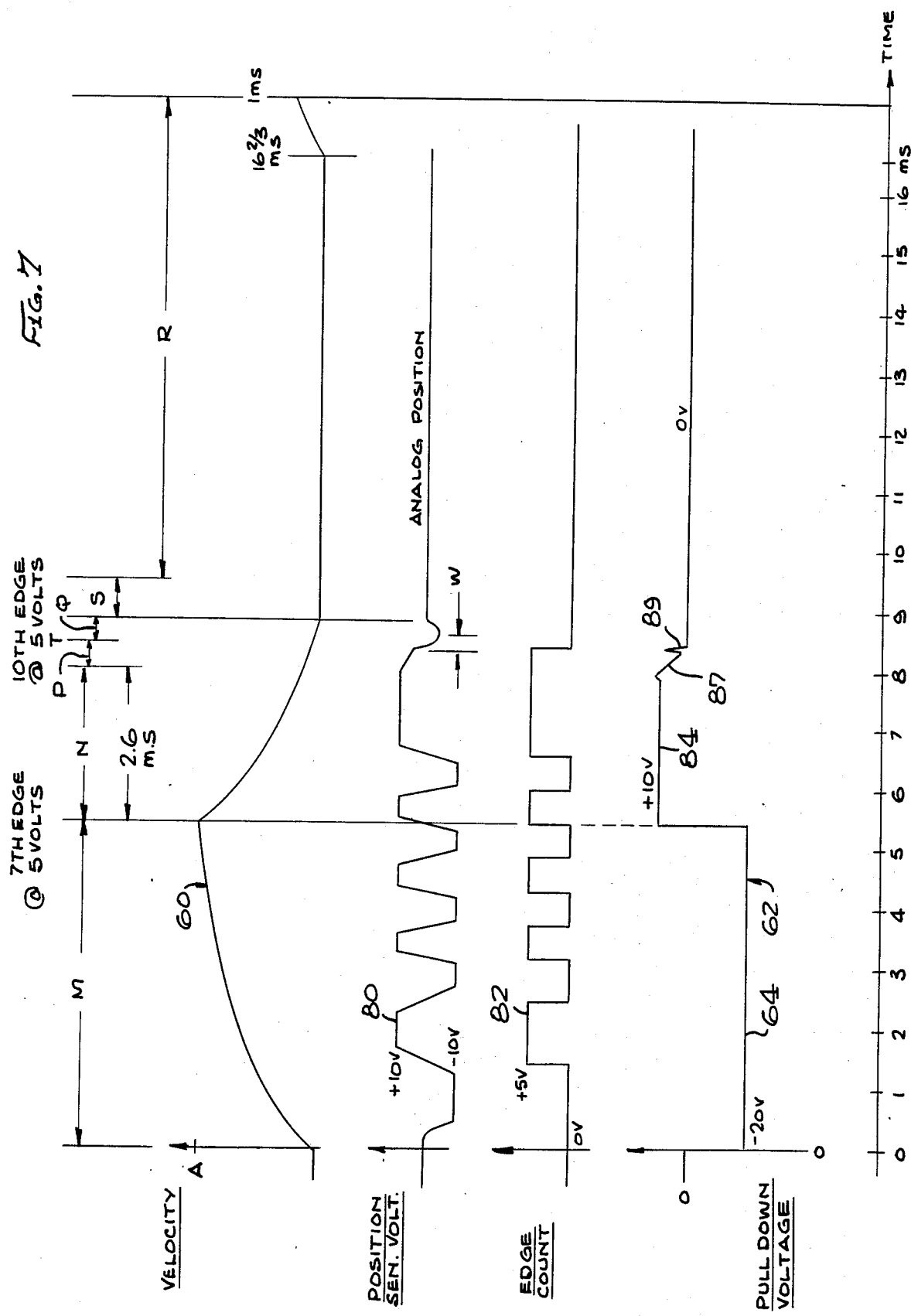

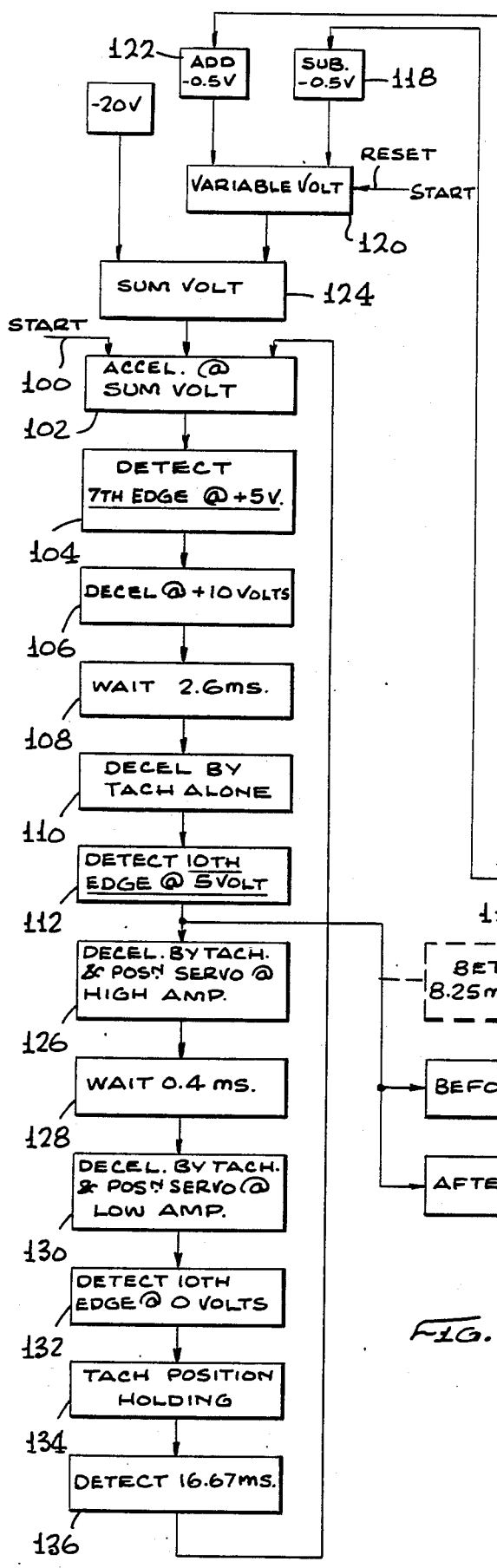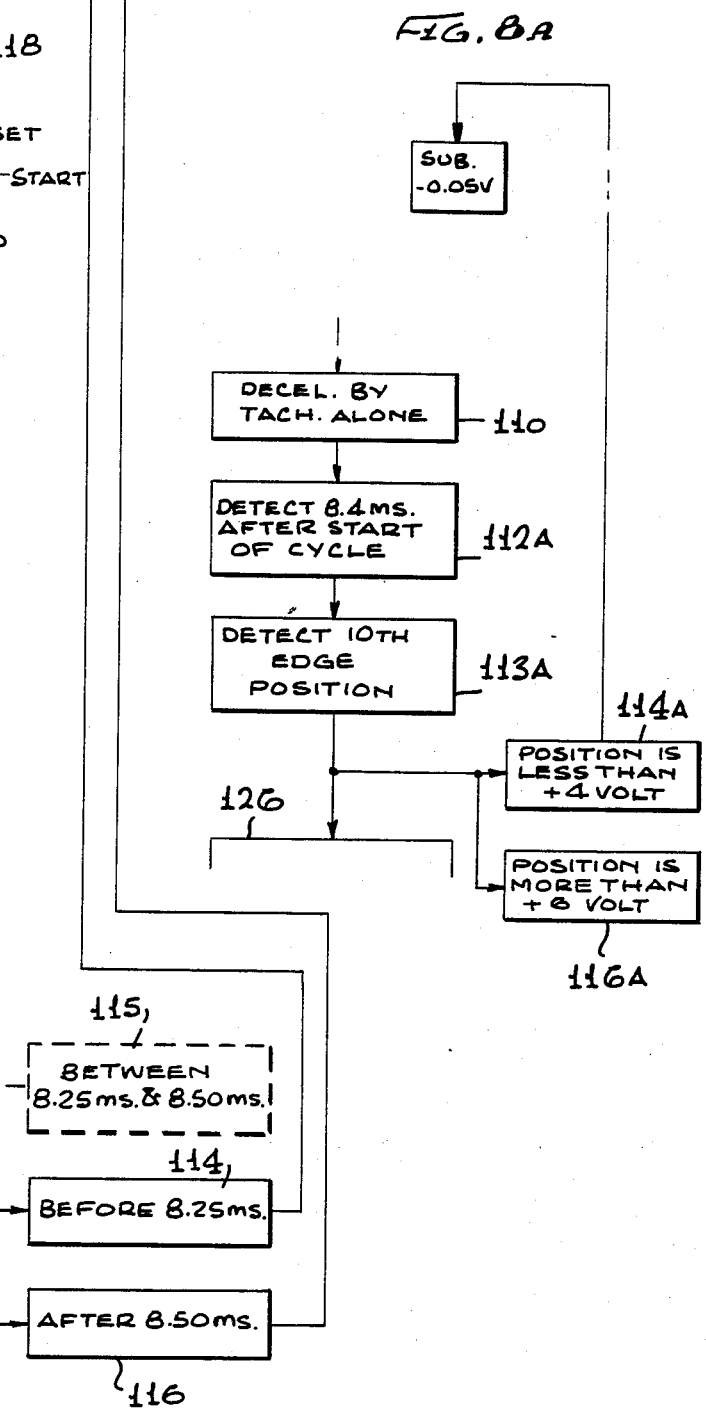
FIG. 8A
FIG. 8

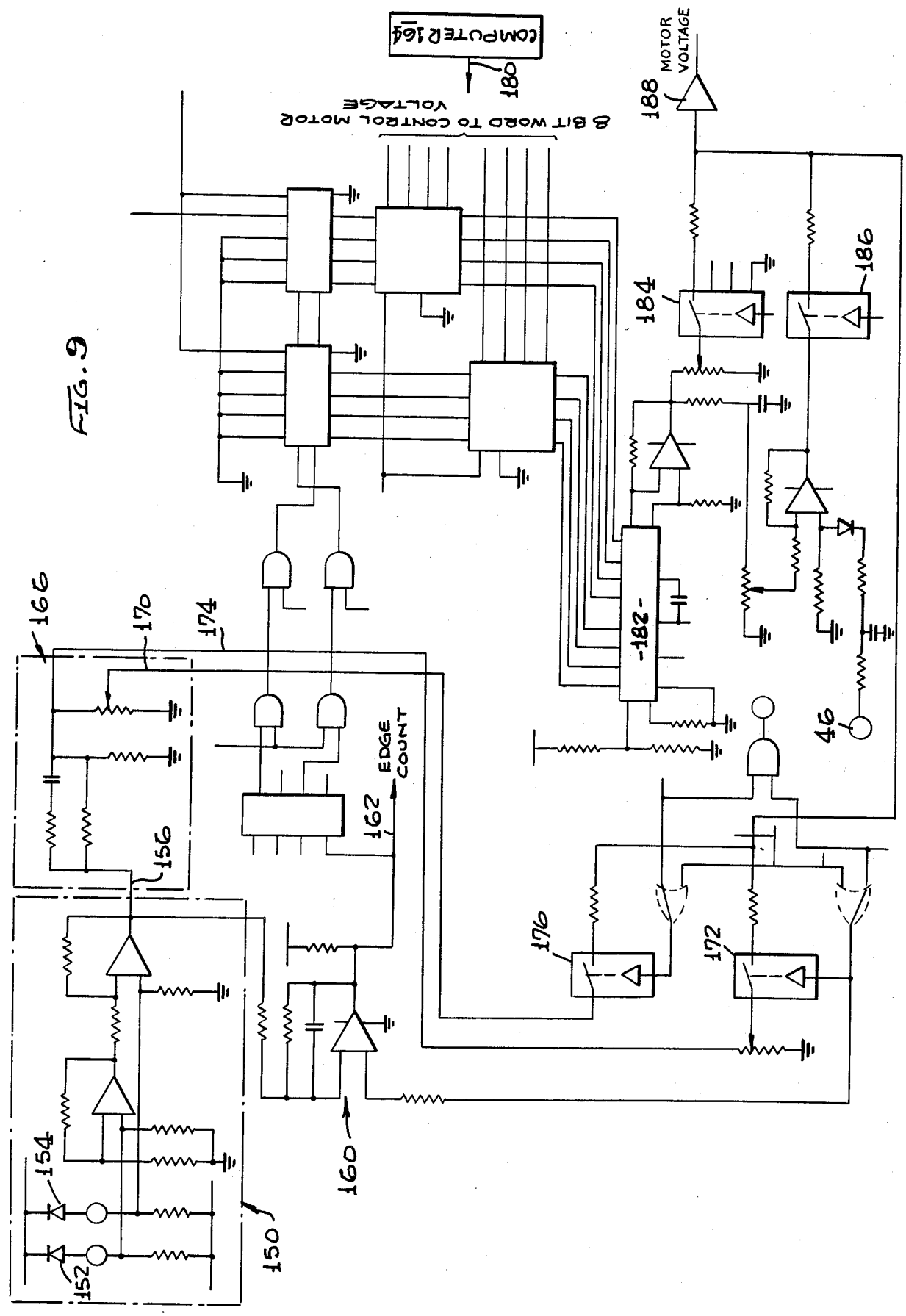

ELECTRONIC PROJECTOR

BACKGROUND OF THE INVENTION

Modern theater-quality motion picture projectors use a motor-driven sprocket wheel to pull the film intermittently through the film gate. In 24 fps (frames per second) systems the film is advanced every 41.67 ms (milliseconds) with the period of film motion preferably occupying no more than about one-half of the cycle to allow the film frame to be projected during the rest of the cycle when it is stationary. In a higher speed system used by the Showscan Film Corporation wherein the film is projected at a rate of 60 fps, each cycle lasts 16.67 ms, and only about one-half of each cycle is available for actual film movement. Accordingly, there is a demand for a film-moving apparatus which can operate reliably and at very high speed.

In a projector of the type using a motor-driven sprocket wheel, a high accelerating voltage is applied at the beginning of each cycle to rapidly accelerate the film and move it along most of the frame-spacing distance. This is followed by a decelerating voltage which rapidly decelerates the film so it is moving slowly near the final film position. A tachometer-controlled voltage may be used near the end of deceleration. After such rapid acceleration and deceleration, during which the film may have moved about 98% of the total distance moved each cycle, the film (and motor) reach a transfer location. At the transfer location a servo-controlled fine-positioning system controls motor energization to quickly move the film to its final position so that film frame can be projected during the rest of the cycle. The shutter opens at a predetermined time after the beginning of each cycle, and it is necessary that the film reach the transfer location early enough and at a low enough speed in each cycle.

Several environmental factors can affect the time required for the film to reach the transfer location and the velocity of the film at that location. If the motor is accelerated and decelerated at high voltages to rapidly move the film, then the motor temperature and power output will change after a few minutes of operation. Wear and heating of parts, and accummulating dirt can slow film acceleration. Changes in the thickness of the film stock can increase or decrease acceleration. If the film moves much too slowly, it may decelerate to a stop before reaching the transfer location, while if a film moves much too fast, it may move past the transfer location so fast that the fine-positioning system cannot operate on it. If the acceleration and deceleration rates are reduced to account for the worst-case situation, then it will require too much time to move the film to the transfer location, and a smaller portion of each cycle will be available for the projection of the film. A system which enabled rapid acceleration and deceleration to be used for rapid film positioning in each cycle, which avoided the danger that the film would not reach the transfer location within the required time or would reach it at too great a velocity, would be of considerable value for motion picture projectors and especially for those which operate at high speed.

SUMMARY OF THE INVENTION

In accordance with one embodiment of the present invention, a motion picture projector is provided, of the type which includes a motor-driven wheel that cyclically advances a film through a film gate, which enables the application of high acceleration and deceleration to the film while avoiding dangers of serious undershoot or overshoot due to changes in environmental factors such as motor heating. The motor-energizing circuit is of the type that applies voltages that rapidly accelerate and then decelerate the film-moving wheel to reach a transfer position near the end of film movement at which a fine-positioning system operates. The circuit includes means for sensing the position of the wheel at a time in each cycle after a majority of film movement but before the transfer location is reached, and for adjusting the acceleration and/or deceleration during a subsequent cycle to urge the wheel to reach the transfer location at a predetermined time.

In one system, a circuit determines whether the film has passed a predetermined position just short of the transfer position before, during, or after a time "window," and for future cycles changes the accelerating voltage to respectively decrease it, increase it, or leave it the same.

The novel features of the invention are set forth with particularity in the appended claims. The invention will be best understood from the following description when read in conjunction with the accompanying drawings.

BRIEF DESCRIPTION OF THE DRAWINGS

FIG. 6 is a view taken on the line 6—6 of FIG. 2.

FIG. 7 comprises a series of graphs showing the variation of parameters of operation with time for the projector of FIG. 1, during one cycle.

FIG. 8 is a flow diagram showing operation of the projector of FIG. 1, while FIG. 8 is a portion of a modified flow diagram.

FIG. 9 is a partial schematic diagram of the motor-driving circuit of FIG. 1.

DESCRIPTION OF THE PREFERRED EMBODIMENTS

Figure 1:
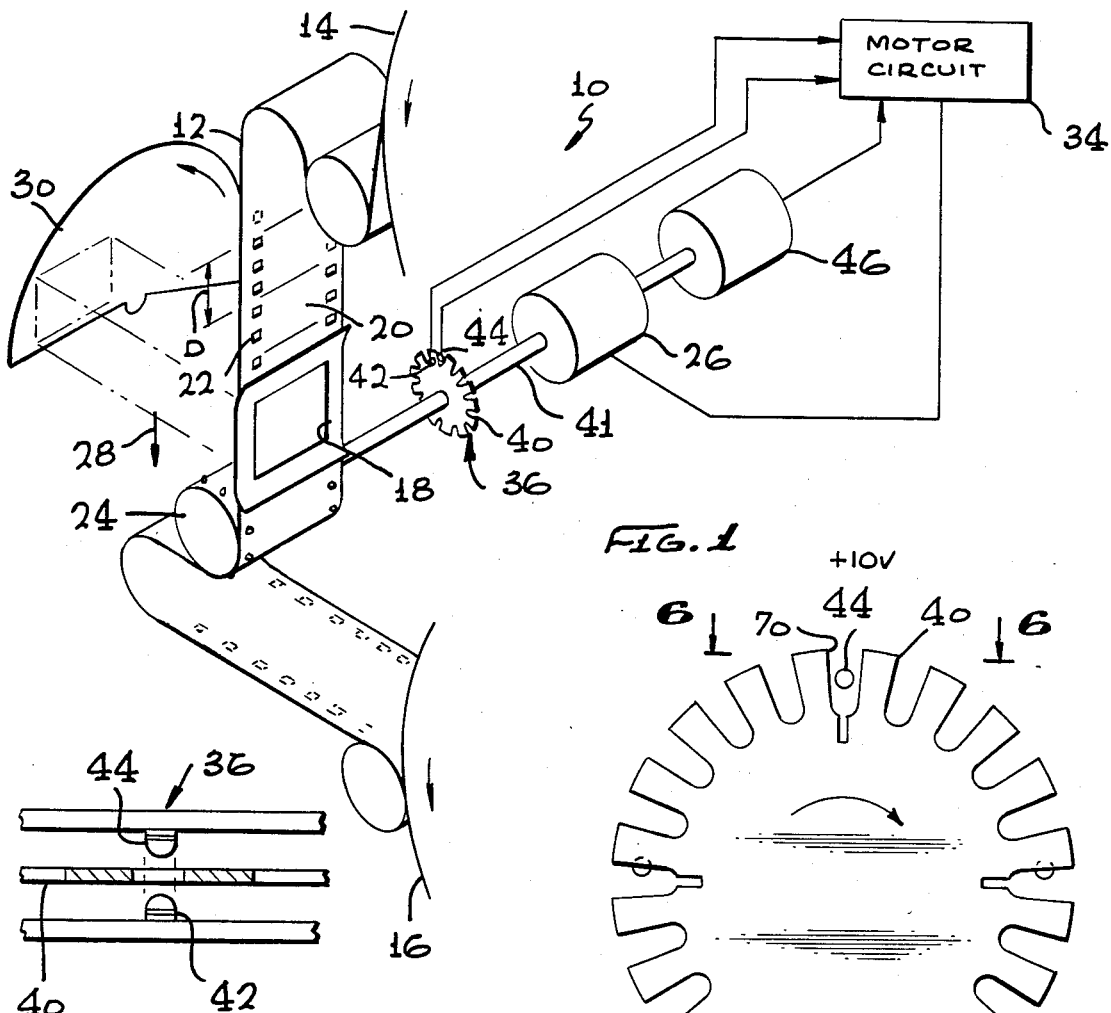
FIG. 1 is a simplified partial-perspective view of a motion picture projector constructed in accordance with the present invention.

FIG. 1 illustrates a motion picture projector 10 which moves film 12 from a supply reel 14 to a take-up reel 16, through a film gate 18. The film includes numerous film frames 20 and has sprocket holes 22 near at least one edge. A sprocket wheel 24 which is driven by a low-inertia motor 26, pulls down the film in the direction of arrow 28 in steps equal to the distance D between subsequent frames on the film. After each film frame has been moved to a precisely repetitive position at the film gate 18, a shutter 30 will have rotated to a position where it is open to allow light to pass from a source (not shown) through the film gate and a projection lens (not shown) onto a screen. For the most common theatrical motion picture films that are projected at 24 fps (frames per second), each cycle lasts 41.67 ms (milliseconds) during which the film must be moved by a distance of one frame and kept stationary while the image of the frame is projected onto the screen. For a 60 fps motion picture film of the type marketed by Showscan Film Corporation, only 16.67 ms is available during each cycle.

The motor 26 is energized by a motor-energizing circuit 34 which senses the position of the film through a sensing means 36 that includes a slotted disk 40 fixed to the output shaft 41 of the motor. A light source 42 and photosensor 44 lie on opposite sides of the disk to sense its position. In one system the distance D between film frames equals the distance between five subsequent sprocket holes 22. The motor and disk 40 turn by one-quarter turn in each cycle, during which ten disk edges pass the photosensor. It also may be noted that a tachometer 46 is fixed to the motor shaft to sense rotational speed.

The operation of the system during a single cycle, during which the film is advanced by the spacing D between frames and is then maintained stationary while the image on the frame is projected, may be explained by considering the graphs of FIG. 7. Graph 60 illustrates the variation in film velocity with time, and is proportional to the output of the tachometer attached to the motor shaft. Graph 62 represents the variation in motor voltage with time. The period of each cycle is that for a Showscan film, where the cycle lasts 16.67 ms. At the beginning of each cycle, at time zero, the voltage 62 suddenly changes from zero to −20 volts and remains at that level for a period M of about 5½ ms (milliseconds). Graph 60 shows that this voltage accelerates the motor from standstill to a maximum velocity A of about 200 frames per second (about 17 feet per second where the frames are spaced 0.97 inch apart in the Showscan system).

At the end of the period M, the voltage 62 is suddenly changed to +10 V, which causes the velocity curve 60 to show a sudden large deceleration for a period N of 2.6 ms. At the end of the period N, the film has been slowed to a velocity of about 30 fps (about 3 feet per second). For a subsequent period P of about ½ ms, the only motor voltage equals the output of the tachometer (46 in FIG. 1), which applies a deceleration proportional to film speed. At the end of the period P, the film is moving at a velocity of about 14 fps (about one foot per second). The end of the period P represents a transfer time T, when a servo-controlled fine-postioning system is used which urges the sprocket wheel to move to a predetermined final postion at which the film frame is in precise registration with the film gate. This fine positioning lasts a period Q of about ½ ms. At the end of the period Q, the film is stationary and located within 0.0004 inch of the desired film gate position. The film remains stationary for another short period S at which time the shutter opens.

The transfer time T, at which the fine-positioning servo controls voltage, can vary from cycle to cycle, and occurs when the film is at a precisely sensed transfer location. It is important that the film reach the transfer location within a limited period of time, and that the film be traveling slowly enough when it reaches the transfer location that the fine-positioning system can quickly slow the film to a stop at the desired final position. If there is excessive build up of dirt or wear of parts, excessive heating of the motor or other parts, or especially heavy film stock, then it would be possible that the motor would be going so slowly at the end of the period N, that the tachometer would slow it to a stop before the transfer location at time T. Alternatively, if the film stock is especially lightweight or other factors (e.g., cold motor) cause faster-than-expected film movement, then the motor might be going so fast at the transfer time T that the fine-positioning system could not slow the film to a stop before reversing it to the final position, before the film overshot the range of distances within which the fine-positioning mechanism can operate.

In accordance with the present invention, the motor-driving circuit is constructed so that it can monitor film movement to determine whether the film is moving properly near the transfer location to enable proper fine positioning of the film. This is accomplished by sensing whether the film has reached a predetermined position located about 0.040 inch rearward of the final position, at a predetermined time or "window" of time. In FIG. 7 this window W has a duration of 0.25 ms, and begins at a time 8.25 ms after the beginning of each cycle and ends 8.50 ms after the beginning of the cycle. If the film has reached the desired transfer location (0.040 inch short of final film position) during this time period (8.25 ms to 8.50 ms), then the projector is operating properly. If the film has not reached the desired transfer location during this time window, then the circuit increases the absolute value of the accelerating voltage indicated at 64, as from −20.00 volts to −20.05 volts, for future cycles, resulting in faster acceleration of the film so it reaches the desired transfer position more quickly. On the other hand, if the film reaches the desired transfer location (0.040 inch short of final film position) prior to the "window" (i.e., before the 8.25 ms time), then the absolute value of the accelerating voltage 64 is decreased, as from −20.00 volts to −19.95 volts. The slotted disk and photosensors of the sensing means 36 are used to precisely sense disk position, and therefore film position.

The change of voltage in a step of 0.05 volt in each cycle is much less than one-third the voltage change required to "cross the window"—that is—to change the time required to reach the transfer position from 8.25 ms to 8.50 ms. It would take about ten of such steps, occuring during ten cycles to make such a change. Such small steps are used to assure that the system gradually adjusts to changing conditions while avoiding jerking or oscillations.

Figure 2:
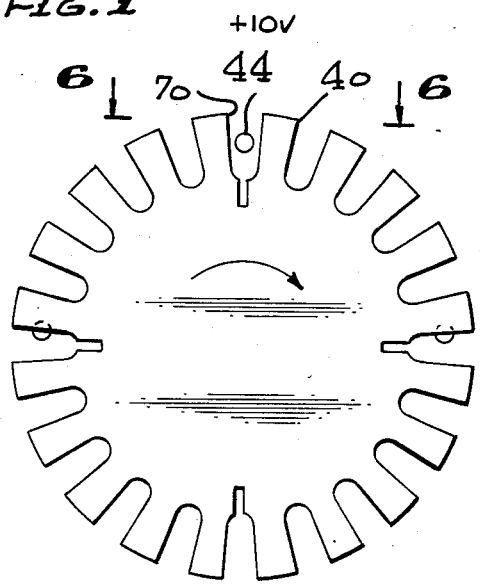
FIG. 2 is a front elevation view of the position-indicating disk in the projector of FIG. 1, at a time when the photosensor lies completely in a slot.
Figure 3:
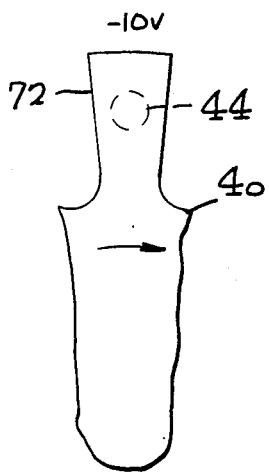
FIG. 3 is a partial view of the disk and photosensor of FIG. 2, shown at a time when a blade of the disk completely covers the photosensor.
Figure 5:
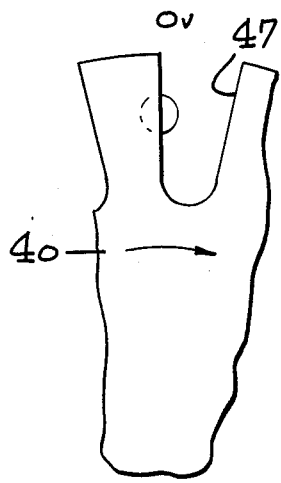
FIG. 5 is a view similar to FIG. 4, but shown at a later time when a blade edge covers precisely one-half of the photosensor.
Figure 4:
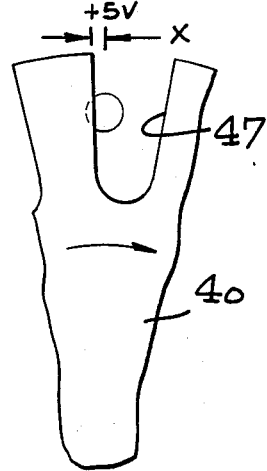
FIG. 4 is a view similar to FIG. 3, but shown at the transfer location when an edge covers a portion of the photosensor but less than one-half of it.

FIGS. 2 through 6 illustrate some details of the sensing means 36 which includes the slotted disk 40, and the light source 42 and photosensor 44 that are on opposite sides of the disk. In FIG. 2, the disk is positioned so a slot 70 of the disk lies over the photosensor 40, so the output of the photosensor 40 is a maximum, such as +10 volts. In FIG. 3, a blade 72 of the disk completely covers the photosensor 44, whose output is then −10 volts. FIG. 5 shows the disk at a position where the blade blocks precisely one-half of the light, so the output of the photodetector 44 is zero volts. FIG. 4 illustrates the situation where the blade blocks precisely one-fourth of the light, so the output of the photosensor 44 is +5 volts. The position in FIG. 4 (at the 10th edge 47) represents the transfer position where the film is 0.040 inch away from the final position, so that upon rotation of the disk by an angle X (and corresponding film movement), the disk and film will be in their final positions which is represented in FIG. 5 where the output of the photosensor is zero volts.

Referring again to FIG. 7, the graph 80 represents the output of the photosensor 44, which varies between +10 and −10 volts. Every time the output of the photosensor passes through +5 volts, applicant considers that an "edge" of a disk has passed the photosensor. Graph 82 indicates the passing of the edges of the disk. In operation of the projector, the accelerating voltage 64 is applied until the 7th edge of the disk (at +5 volts) is detected. At that instant, the motor voltage is suddenly changed to the level 84 of +10 volts, to cause rapid deceleration of the motor, and the +10 volt level is maintained for an additional 2.6 ms, when the end of period N occurs. Immediately after the end of period N, only tachometer voltage at 87 is applied to the motor to slow it according to the motor velocity, until the 10th edge of the disk reaches the position shown at 47 in FIG. 4, indicating that the disk and film are precisely at the transfer position. At that point, the motor-driving circuit applies a voltage 89 equal to tachometer voltage plus the amplified voltage of the photosensor 44. The output of the photosensor 44 is positive until the edge of the blade reaches the position 88 in FIG. 5 and thereafter is negative to rapidly position the film and disk at the final position despite any overshooting in either direction. The tachometer output continues to be applied to the motor while the film is stationary. The tachometer output acts like mechanical friction that tends to slow the motor and that tends to maintain a constant sprocket wheel and film position after the sprocket wheel has stopped. It may be noted that the shutter 30 is a heavy member which rotates at a uniform rate and opens at a predetermined time (e.g., 9 ms) after the beginning of each cycle. At the beginning of the next cycle (at 16.67 ms), the tachometer voltage is not applied (until the end of period N in the next cycle), to avoid the effect of the tachometer of preventing rapid initial acceleration and deceleration.

FIG. 8 is a flow diagram showing the manner of operation of the projector system. At the start of projector operation, a start step indicated at 100 begins step 102, of applying the acceleration voltage of −20 V to the motor. At step 104, the sensor detects the 7th edge of the disk (at the instant the photosensor voltage drops to +5 volts). At the next step 106 a deceleration voltage of +10 volts is applied to the motor. At the next step 108 a clock detects a time 2.6 ms after detection of the 7th edge. At that time, the next step 110 is to apply a voltage to the motor equal to the output of the tachometer alone. At a next step 112 the sensors detect the tenth edge of the disk at a position where the photodetector output is +5 volts. At that instant, a determination is made as to whether or not the 10th edge at +5 volts was detected during the window (8.25 ms to 8.50 ms). If it was detected during the time window, nothing is to be done so this step is indicated in phantom lines at 115. The alternatives are a determination made at step 114 that the 10th edge (at +5 volts) was detected before 8.25 ms, or a determination at step 116 that the 10th edge (at 5 volts) was detected after 8.50 ms. When a step 114 occurs, a following step 118 is performed whereby −0.05 volts is substracted from a variable voltage at 120 (the variable voltage is initially zero volts). If step 116 is carried out, then a step 122 follows which adds −0.05 volts in the step 120. The previously accummulated voltage at 120 is added to the −20 volt level at a step 124, so that for subsequent cycles a voltage different from −20 volts is applied during acceleration.

Instead of varying the acceleration voltage, it is possible to vary the period during which the acceleration voltage is applied, by applying it until a predetermined period such as 5.7 ms after the start of the cycle, or after a predetermined disk position is sensed such as detection of the 7th disk edge at +4 or +6 volts (instead of +5 volts). Alternatively, the level or duration of the deceleration voltage which accelerates in a rearward direction (normally +10 volts) can be varied. Instead of detecting whether the transfer position (10th edge at +5 volts) has occurred before or after a predetermined time window (lasting from 8.25 ms to 8.50 ms), it is possible to detect the precise position of the disk (from the voltage output of the photodetector) at a particular instant such as at 8.4 ms, and to increase or decrease the acceleration voltage for future cycles if a position "window" (e.g., tenth edge at +4 volts to +6 volts) is reached respectively after or before a particular instant (8.4 ms). FIG. 8A includes steps 112A, 113A, 114A, and 116A which can be substituted for the steps 112, 114, 116 in FIG. 8 to carry out the process of detecting the precise position of the disk at a particular instant to make corrections.

After the 10th edge at +5 volts is detected, servo positioning (with tachometer voltage added) begins at 126 with the feedback voltage (from photosensor 44) at high amplification. This continues for 0.4 ms during step 128. Then the servo feedback voltage is switched to low amplification at 130 until the 10th edge at zero volts is detected at 132. Tachometer output continues to be applied at 134 to hold the film stationary, until the end of the cycle is detected at 136, to begin a new cycle.

FIG. 9 is a partial circuit diagram of a circuit which powers the motor, and carries out the corrections described above. The circuit includes a differential amplifier 150 whose input is the voltage output of two photosensors 152, 154 (FIG. 2), and whose output on line 156 is a position sensing voltage. The output on line 156 drives a circuit 160 whose output on line 162 is an edge count (shown at 82 in FIG. 7). This output at 162 is delivered to a computer 164 of the motor-positioning circuit which counts the edges. The output on line 156 also passes through a feed forward compensation 166 which provides high gain while suppressing oscillations. One output 170 of the feed forward compensation is delivered to a switch 172 of the fine-positioning system which switches in high amplification of the position sensing voltage (step 126 in FIG. 8) at the transfer time. Another output 174 of the feed forward compensation is (0.4 ms later) delivered through a switch 176 of the fine-positioning system which switches in low amplification (about two-thirds of high) to bring the film to its final position. The switching to lower amplification which is at least 10% less than high, allows a high amplification to be used which would cause oscillations if continued to final film position. The output at 180 controls a digital-to-analog converter 182 to generate any voltage (in 256 steps) within a range. This output is added to the output of the tachometer 46 at times controlled by computer-operated switches 184, 186. A power amplifier 188 delivers the resulting voltage to the motor.

Thus, the invention provides a motion picture projector which can withstand high motor currents for rapid initial acceleration and deceleration, without causing failure of operation when motor heating during the first several minutes of operation, as well as other variables, causes changes in actual acceleration and deceleration.

This is accomplished by monitoring movement to a position prior to the transfer time when servo positioning occurs in actual time during a cycle of operation, adjusting motor current accordingly during subsequent cycles. Servo-controlled fine positioning is accomplished initially at a high amplification of the feedback signal, and finally at a low amplification. The tachometer output is not included in setting motor voltage until after acceleration and preferably after most deceleration, to enable present high voltages to be used for most rapid film movement.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. In a projector having a sprocket wheel which cyclically pulls a film having film frames spaced by a predetermined frame-spacing distance in a forward direction through a film gate, an electrically energized motor which cyclically drives said sprocket wheel, and a motor-energizing circuit which applies a plurality of high voltages to rapidly accelerate said sprocket wheel then rapidly decelerate said sprocket wheel, and which then applies a fine adjustment to sprocket wheel position during each cycle to accurately position a film frame at the film gate at the end of the cycle, the improvement wherein:

said motor-energizing circuit includes means for sensing the position of said sprocket wheel at a time in each cycle after a majority of wheel movement in the cycle has occurred, and for adjusting the application of at least one of said high voltages during a subsequent cycle to urge the sprocket wheel to reach a predetermined position at a predetermined time during the subsequent cycle.

2. The improvement described in claim 1 wherein:

said circuit applies an accelerating voltage at the beginning of each cycle;

said predetermined time comprises a time window of preset duration that begins a predetermined precise time after the beginning of each cycle;

said circuit includes means for detecting whether said wheel has reached a predetermined precise position before, during, or after said time window, and for respectively decreasing, leaving unchanged, or increasing the accelerating voltage in the next cycle.

3. The improvement described in claim 2 wherein:

said means for sensing the position of the wheel includes a disk-like member mounted to rotate with the wheel and having multiple slots defining multiple edges that move along a circular path as the wheel rotates, and a light source and photosensor on opposite sides of the path of said edges for passing light across said edges, whereby the output of said photodetector changes as an edge that is partially blocking light moves between said light source and photodetector;

said detecting means of said circuit is constructed to detect whether the output of said photodetector passes a predetermined output level during said time window.

4. The improvement described in claim 1 wherein:

said circuit applies an accelerating voltage at the beginning of each cycle; and said circuit includes means for sensing whether said sprocket wheel has, at a predetermined time, reached a position rearward, forward, or within a predetermined acceptable range of locations, and for respectively increasing, decreasing, or leaving unchanged the accelerating voltage in the next cycle.

5. The improvement described in claim 1 including:

a tachometer coupled to said motor and generating an output largely proportional to motor rotation speed;

said circuit means includes a position servo which generates a voltage dependent upon motor position;

said circuit means is constructed to begin to apply said tachometer voltage to said motor only after most of the film movement has occurred which occurs in each cycle and until the film reaches a transfer location, to apply the tachometer voltage plus the position servo voltage until the film is stopped, to apply the tachometer voltage to the end of the cycle to stop the application of tachometer voltage at the end of the cycle.

6. The improvement described in claim 1 wherein:

said circuit means includes means for detecting the motor reaching a transfer location, and a position servo, said position servo including means for generating a feedback voltage dependent upon motor position and means for amplifying said feedback voltage and applying it to said motor;

said amplifying means including means for amplifying said feedback voltage at a high amplification during an initial period after said motor reaches said transfer location, and for amplifying said feedback voltage at a lower amplification until the film stops.

7. In a projector having a sprocket wheel which cyclically pulls a film having film frames spaced by a predetermined frame-spacing distance in a forward direction through a film gate, an electrically energized motor which cyclically drives said sprocket wheel, and a motor-energizing circuit which applies a plurality of high voltages to rapidly accelerate said sprocket wheel then rapidly decelerate said sprocket wheel, and which then applies a fine adjustment to sprocket wheel position during each cycle to accurately position a film frame at the film gate at the end of the cycle, the improvement wherein:

said motor-energizing circuit includes means for sensing whether the sprocket wheel has passed a predetermined position, before or after a predetermined window of time which starts a first preset time after the beginning of each cycle and ends a second preset time after the beginning of each cycle, and means for adjusting the application of at least one of said high voltages to cause the wheel to pass said predetermined position closer to said window of time.

8. The improvement described in claim 7 wherein:

said means for adjusting is constructed to decrease or increase the high voltage used to accelerate said wheel, according to whether said wheel has respectively passed said predetermined position before or after said window.

9. The improvement described in claim 7 wherein:

said adjusting means is constructed to change the application of said high voltage by an amount that is small enough in each cycle that it would require a plurality of such changes to cause a wheel passing said position at the beginning of said window before the changes, to pass said position at the end of said window after the changes.

10. In a projector having a sprocket wheel which cyclically pulls a film having film frames spaced by a predetermined frame-spacing distance in a forward direction through a film gate, an electrically energized motor which cyclically drives said sprocket wheel, and a motor-energizing circuit which applies a plurality of high voltages to rapidly accelerate said sprocket wheel then rapidly decelerate said sprocket wheel, and which then applies a fine adjustment to sprocket wheel position during each cycle to accurately position a film frame at the film gate at the end of the cycle, the improvement wherein:

said motor-energizing circuit includes means for sensing whether the sprocket wheel has passed within a predetemined range of position before or after a preset time after the beginning of each cycle, and means for adjusting the application of at least one of said high voltages to cause the wheel to pass closer to said range of positions at said preset time.

11. The improvement described in claim 10 wherein:
said means for adjusting is constructed to decrease or increase the high voltage used to accelerate said wheel, according to whether said wheel has respectively passed said predetermined range of positions before or after said preset time.

12. The improvement described in claim 10 wherein:
said adjusting means is constructed to change the application of said high voltage by an amount that is small enough in each cycle that it would require a plurality of such changes to cause a wheel passing through the beginning of said range of positions at said preset time before the changes, to pass through the end of said range of positions at said preset time after the changes.

13. In the operation of a projector wherein a motor cyclically drives a sprocket wheel to pull a film by a predetermined frame-spacing distance in a forward direction through a film gate to position subsequent film frames accurately at the film gate, the motor being energized by a circuit which rapidly accelerates the motor in a forward direction starting at the beginning of each cycle then rapidly accelerates the motor in a rearward direction and then applies a fine adjustment to motor position, during each cycle, before projecting the film frame at the end of the cycle, the improvement comprising:

sensing the position of the sprocket wheel in each of a plurality of cycles at a time in the corresponding cycle after a majority of wheel movement for that cycle; and adjusting the acceleration of said motor during a subsequent cycle to urge the sprocket wheel to substantially reach a predetermined position closer to a predetermined time in the corresponding cycle.

14. The improvement described in claim 13 wherein:
said circuit is operated to apply a first motor voltage to said motor during rapid acceleration, and dependent upon said sprocket wheel reaching a position rearward, forward, or at said predetermined location at said predetermined time respectively increasing, decreasing, or leaving unchanged said first motor voltage during a subsequent cycle.

15. The improvement described in claim 13 wherein:
said step of sensing includes sensing whether the sprocket wheel has reached said predetermined position before or after a predetermined window of time which begins and ends at preset times after the beginning of each cycle, and said step of adjusting includes respectively decreasing or increasing the level of motor acceleration in the forward direction in a subsequent cycle.

16. The improvement described in claim 13 wherein:
said step of applying a fine adjustment to motor position includes generating a position feedback voltage of a level dependent upon the difference between actual and final desired motor position, amplifying said feedback voltage by a high amplification beginning when the motor reaches a predetermined transfer postion and for a predetermined period of time thereafter, and amplifying feedback voltage by a low amplification beginning at the end of said predetermined period of time and continuing until the motor stops.

* * * * *